United States Patent [19]

Moore

[11] Patent Number: 5,255,932
[45] Date of Patent: Oct. 26, 1993

[54] SUPEREFFICIENT BICYCLE STRUCTURE

[76] Inventor: James D. Moore, 1823 Border Ave., Torrance, Calif. 90501

[21] Appl. No.: 728,429

[22] Filed: Jul. 11, 1991

[51] Int. Cl.⁵ .............................................. B62K 19/02
[52] U.S. Cl. ............................... 280/281.1; 280/288.3; 72/367
[58] Field of Search ..................... 280/281.1, 288.3; 72/367

[56] References Cited

U.S. PATENT DOCUMENTS

| | | |
|---|---|---|
| 611,399 | 9/1898 | Webster . |
| 908,127 | 12/1908 | Passmore . |
| 2,080,698 | 5/1937 | Clark . |
| 2,144,332 | 1/1939 | Glaser . |
| 2,353,712 | 7/1944 | Dewey ............................ 280/281.1 |
| 2,493,037 | 1/1950 | Simon . |
| 2,595,075 | 4/1952 | Henderson . |
| 2,773,695 | 12/1956 | Holloway ................... 280/281.1 X |
| 3,030,124 | 4/1962 | Holloway . |
| 3,226,132 | 12/1965 | Otani . |
| 3,533,643 | 10/1970 | Yamada . |
| 3,833,242 | 9/1974 | Thompson . |
| 3,889,975 | 6/1975 | Falconi . |
| 3,966,230 | 6/1976 | Nicol . |
| 4,015,854 | 4/1977 | Ramond . |
| 4,047,731 | 9/1977 | Van Auken ..................... 280/281.1 |
| 4,145,068 | 3/1979 | Toyomasu . |
| 4,293,141 | 10/1981 | Brilando ...................... 280/281.1 X |
| 4,437,679 | 3/1984 | Campagnolo ................... 280/281.1 |
| 4,479,662 | 10/1984 | Defour . |
| 4,493,749 | 1/1985 | Brezina . |
| 4,500,103 | 2/1985 | Klein . |
| 4,541,649 | 9/1985 | Grunfeld . |
| 4,548,422 | 10/1985 | Michel . |
| 4,550,927 | 11/1985 | Resele . |
| 4,583,755 | 4/1986 | Diekman . |
| 4,585,247 | 4/1986 | Takada ............................ 280/281.1 |
| 4,605,241 | 8/1986 | Graham . |
| 4,648,616 | 3/1987 | Diekman . |
| 4,657,795 | 4/1987 | Foret . |
| 4,705,286 | 11/1987 | Lauzier . |
| 4,792,150 | 12/1988 | Groendal . |
| 4,813,591 | 3/1989 | Mueller . |
| 4,846,490 | 7/1989 | Hashimoto . |
| 4,850,607 | 7/1989 | Trimble . |
| 4,856,800 | 8/1989 | Hashimoto . |
| 4,900,048 | 2/1990 | Derujinsky . |
| 4,900,049 | 2/1990 | Tseng . |
| 4,900,050 | 2/1990 | Bishop . |
| 4,902,160 | 2/1990 | Jeng . |
| 4,902,458 | 2/1990 | Trimble . |
| 4,921,267 | 5/1990 | Kirk . |
| 4,923,203 | 5/1990 | Trimble . |
| 4,940,356 | 7/1990 | Hashimoto . |
| 4,974,864 | 12/1990 | Giocastro . |
| 4,982,975 | 1/1991 | Trimble ........................... 280/281.1 |
| 4,993,735 | 2/1991 | Chen . |
| 5,076,601 | 12/1991 | Duplessis ....................... 280/281.1 |

FOREIGN PATENT DOCUMENTS 0608223  9/1948  United Kingdom ............ 280/281.1

*Primary Examiner*—Margaret A. Focarina
*Assistant Examiner*—C. Mattix
*Attorney, Agent, or Firm*—Lee W. Tower

[57] ABSTRACT

A superefficient bicycle frame having a plurality of dual tapered rectangular or square cross section frame members having constant wall thickness. The torsional/bending section modulus of a member is changed by providing a dual taper to the cross section of the frame members so that larger cross sections are used at points of greatest stress and smaller cross sections are used at points of lower stress. The method of manufacture is to cut various two dimensional shapes from sheet stock which are bent along nonparallel bend lines to form the various members. This method of manufacture permits the ends of the section members to be shaped as desired by laser or plasma cutting, or other means, in the flat before bending. The tapered frame members are then connected to form a superefficient frame.

7 Claims, 4 Drawing Sheets

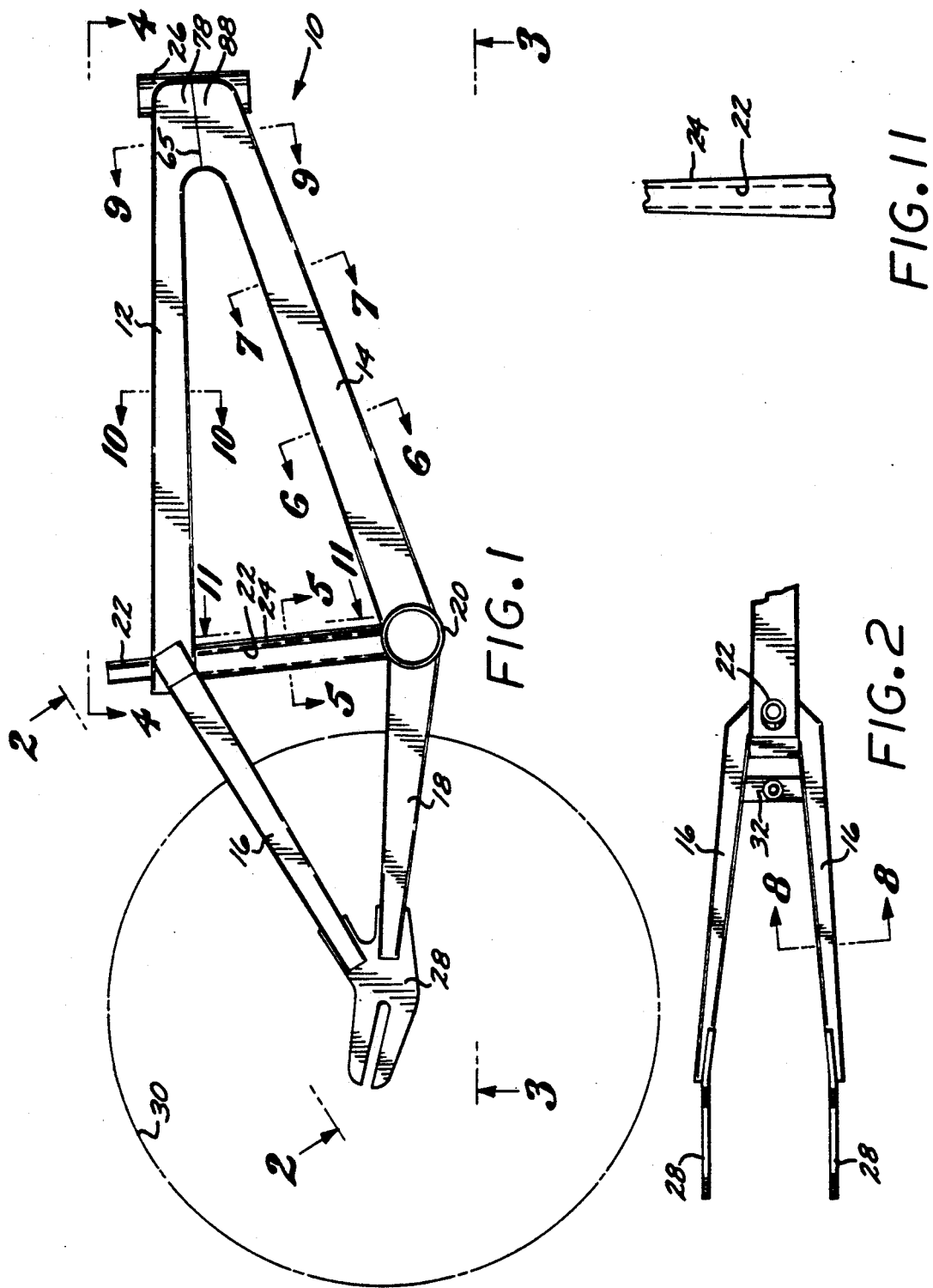

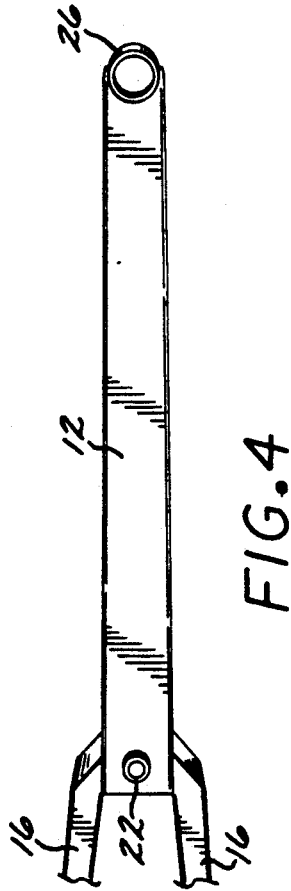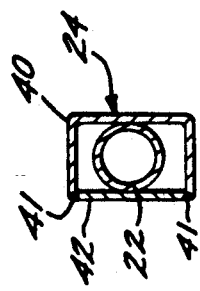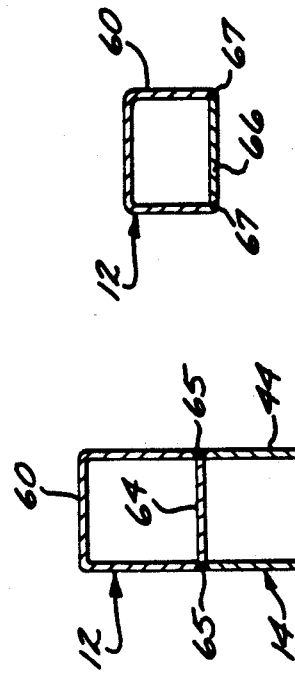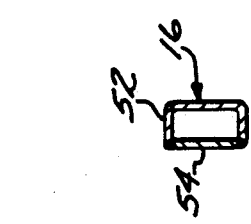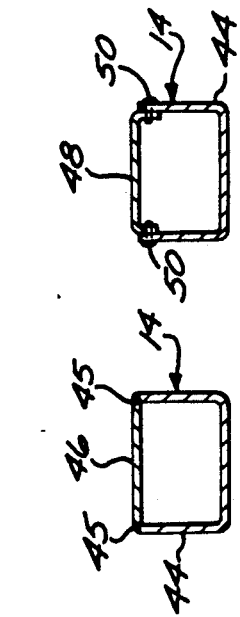

SUPEREFFICIENT BICYCLE STRUCTURE

BACKGROUND OF THE INVENTION

1. Field of the Invention

This invention relates to bicycle framesets and more particularly to lightweight high performance bicycle framesets expected to be subjected to severe impact loads encountered in off-road racing.

2. Prior Art

Racing bicycle framesets used on dirt tracks and for off road "mountain" racing require a combination of construction features which include high strength, stiffness, and low weight. Frame rigidity and bicycle weight are two interrelated factors which are very significant, particularly for high performance racing bicycles. The lower the bicycle weight, the greater the pedalling responsiveness of the bicycle. Similarly, the more rigid the frame, the greater the pedalling ease. Ideally, bicycle frames should exhibit minimal torsional and transversal flexing caused by pedalling effort and steering maneuvers. The classic diamond shaped bicycle frame is subject to bending and torsional stresses, particularly when the rider exerts pressure first on one pedal and then the second pedal. Flexing in the bicycle frame uses up rider energy which might otherwise power the bicycle in a forward direction. Flexing can also destabilize bicycle steering in a high speed downhill race. Bicycle frames should ideally be practical to manufacture and be so constructed that a minimal amount of material is used to manage the stresses from the various loads in order to minimize weight.

Prior art inventions have fulfilled some of these requirements in one or more of the following ways: (1) by making special round tubular frame elements in which the wall thickness of the tube increases where stress is concentrated; (2) by employing improved manufacturing processes, particularly welding and heat treating processes for joining lightweight alloys such as titanium and aluminum; (3) by increasing the diameter of certain elements which are assumed to carry greater loads; (4) by employing stiff, lightweight composite materials, the shape of which can be varied more practically than with metallic tubular elements, such as U.S. Pat. No. 4,900,048; and (5) by wrapping a metallic tubular frame with a composite material of variable thickness or with composite fibers oriented to maximize structural efficiency, such as in U.S. Pat. No. 4,047,731.

Prior art bicycle framesets typically fulfill one requirement at the expense of another, or require impractical means of manufacture. In some prior art inventions, such as U.S. Pat. No. 2,493,037, all of the walls of the tubular elements do not connect to the walls of other critical elements, creating stress concentrations and reductions in strength, stiffness and fatigue life, because loads are not properly transferred among the various elements. Other prior art inventions that employ combinations of composite and metallic materials in their construction are difficult to manufacture or tend to have low joint efficiency where members are bonded together. Certain other prior art inventions achieve considerable strength and stiffness vertically and longitudinally to the direction of travel, whereas transversal and torsional strength and stiffness do not reach high values.

SUMMARY OF THE INVENTION

The object of the present invention is a superefficient structure which optimally meets the aforementioned strength, stiffness and fatigue life requirements, features particularly strong joints, is made primarily of sheet metal alloys of aluminum, titanium or steel, and fabricated and finished using ordinary and practical manufacturing processes, while presenting a sturdy and attractive appearance.

The invention employs dual tapered rectangular or square cross section tubular members having constant wall thickness, readily fabricated from sheet stock and welded or riveted together. The members are so shaped on the ends and so intersect other members as to maximize joint efficiency and strength. The members are square or rectangular in cross section to maximize joint weld length and to considerably increase member section modulus for a given cross-sectional area compared to a member of round cross section. The taper of the rectangular or square cross section members of the frame allows the members to be larger in cross section in areas where various loads induce the largest combined bending, differential bending, torsional, tensile and/or compressive stresses and smaller in cross section in areas where the loads are less, which optimizes the strength and stiffness of the frame at the minimum weight.

The invention may be constructed by cutting various two dimensional shapes from sheet stock which are subsequently formed into channels, which are then jigged and welded or riveted together. This method of manufacture permits the ends of the section members to be shaped by laser or plasma cutting, or other means, in the flat before bending. The ends of the sections thus cut and formed have shapes which maximize the strength, weld length and fatigue life of the butted joints, because loads are transferred between the various elements with maximum efficiency.

BRIEF DESCRIPTION OF THE DRAWINGS

A better understanding of the invention and its advantages will be apparent from the detailed description taken in conjunction with the accompanying drawings in which:

FIG. 1 is a side elevation view of a frame of the present invention showing the placement of the rear wheel for perspective.

FIG. 2 is a fragmentary rear elevation view of a frame of the present invention, taken along line 2—2 of FIG. 1.

FIG. 3 is a bottom view of a frame of the present invention, taken along line 3—3 of FIG. 1.

FIG. 4 is a fragmentary top view of a frame of the present invention, taken along line 4—4 of FIG. 1.

FIG. 5 is a sectional view of the seat tube and seat tube frame of the present invention, taken along line 5—5 of FIG. 1.

FIG. 6 is a sectional view of the down tube of the present invention, taken along line 6—6 of FIG. 1.

FIG. 7 is an alternate sectional view of the down tube of the present invention, taken along line 7—7 of FIG. 1 and shows using rivets instead of welds.

FIG. 8 is a sectional view of the seat stay of the present invention, taken along line 8—8 of FIG. 2.

FIG. 9 is a sectional view of the junction of the top tube and the down tube of the present invention, taken along line 9—9 of FIG. 1.

FIG. 10 is a sectional view of the top tube of the present invention, taken along line 10—10 of FIG. 1

FIG. 11 is a side elevation view of the seat tube brace of the present invention, taken along the line 11—11 of FIG. 1.

DESCRIPTION OF THE PREFERRED EMBODIMENTS

Figure 12:
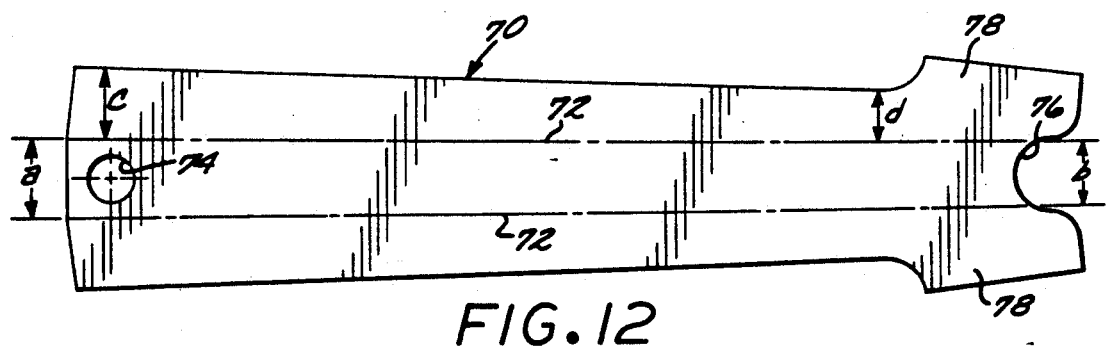
FIG. 12 is a top view of the unformed top tube channel of the present invention.

Referring now to the drawings, and more particularly, to FIG. 1, there is shown a superefficient bicycle frame 10 of the present invention. The primary frame members are the rectangular double tapered top tube 12, the rectangular double tapered down tube 14, the rectangular double tapered seat stay 16, the rectangular single tapered chain stay 18, and the rectangular single tapered seat tube brace 24. All of the rectangular members can also be square in crosssection at one or more points along their length with the same double or single tapered design. It would be possible to have the primary frame members be: a square double tapered top tube 12, a square double tapered down tube 14, a square double tapered seat stay 16, a square single tapered chain stay 18, and a square single tapered seat tube brace 24. The present invention includes both rectangular and square embodiments; however, the remainder of this disclosure will describe the tubes as rectangular with the understanding that they could also be square. This is clear from the definition of a rectangle, which is any four sided place figure with four right angles.

There are four primary junctions of the frame members. The rectangular double tapered down tube 14, the rectangular single tapered chain stay 18, and the rectangular single tapered seat tube brace 24 join together at the bottom bracket 20. Particular care is taken in the design of the tubes so that the joint transfers the stresses to the bottom bracket. At the top of the rectangular single tapered seat tube brace 24, the rectangular single tapered seat tube brace 24, the rectangular double tapered top tube 12 and the rectangular double tapered seat stay 16 join together. Interior to the rectangular single tapered seat tube brace 24 is a seat tube 22 for mounting a seat. The rectangular double tapered seat stay 16 and the rectangular single tapered chain stay 18 are joined by the dropout bracket 28 for the rear wheel 30. Finally, the rectangular double tapered top tube 12 and the rectangular double tapered down tube 14 join at the head tube 26. Again special care is taken in the shape of the tubes at this joint to properly transfer the stresses to the head tube.

In FIG. 1 it should be noted that the rectangular double tapered top tube 12 tapers in the side elevation from being a wider cross section at the seat tube 22 end and narrower cross section at the head tube 26 end. Again as shown in FIG. 1, the rectangular double tapered down tube 14 has narrower cross section at the head tube 26 end and wider cross section at the bottom bracket 20 end; the rectangular double tapered seat stay 16 has narrower cross section at the dropout bracket 28 end and wider cross section at the seat tube 22 end; and the rectangular single tapered chain stay 18 has narrower cross section at the dropout bracket 28 end and wider cross section at the bottom bracket 20 end. Also, as shown in FIG. 11, the rectangular single tapered seat tube brace 24 has wider cross section at the bottom bracket 20 than at the top where it joins the rectangular double tapered top tube 12 and the rectangular double tapered seat stay 16. The wider cross sections of frame members at the bottom bracket 20 recognize the extraordinary transversal bending and torsional stresses that are put on the frame and specifically on bottom bracket 20 during pedalling. They also permit longer welds and reduced stress concentrations at their junctures compared to round tubes The rectangular double tapered top tube 12 and rectangular double tapered seat stay 16 also have wider cross sections at seat tube 22 where the transversal bending stresses combine with compressive stresses in the upper members of the frame.

FIG. 2 shows a rear elevation view of the rectangular double tapered seat stays 16. The rectangular double tapered seat stays 16 taper in the side view of FIG. 1 so that they are wider at the seat tube 22 end and narrower at the dropout bracket 28 end and, as seen in FIG. 2 in the rear elevation view, the rectangular double tapered seat stays 16 also have a wider cross section at the seat tube 22 end and narrower cross section at the dropout bracket 28 end. The dual taper is linear between the narrowest cross section and the widest cross section. The two rectangular double tapered seat stays 16 together with the two rectangular single tapered chain stays 18, shown in FIG. 3, form a fork into which the rear wheel can be mounted. A brake bracket 32 can be mounted in the usual way across the two rectangular double tapered seat stays 16.

FIG. 3 is a bottom view of the frame of FIG. 1. Both the side elevation view of rectangular double tapered down tube 14 and the bottom view of rectangular double tapered down tube 14 show that the rectangular double tapered down tube 14 has wider cross section at the bottom bracket 20 than at the head tube 26. The dual taper is linear between the narrowest cross section and the widest cross section.

FIG. 4 is a top view of a fragmentary section of the frame of FIG. 1. Both the side elevation view of rectangular double tapered top tube 12 and the top view of rectangular double tapered top tube 12 show that the rectangular double tapered top tube 12 has wider cross section at the seat tube 22 than at the head tube 26.

Again, the dual taper is linear between the narrowest cross section and the widest cross section.

The section modulus of a cross section is a measure of the cross sections bending/torsional strength. The formula for the section modulus of a round tube is:

$$Z_r = Pi^*(D^4 - d^4)/32D,$$

where:
D = the outside diameter
d = D minus 2 times the material thickness
Pi = 3.141593

The formula for the section modulus of a square tube is:

$$Z_s = (a^4 - b^4)/6a,$$

where:
a = the outside length of one side, and
b = a minus 2 times the material thickness Comparing the section modulus for a 1 ½" (D) diameter round tube with the section modulus for a 1 ½" (a) square tube, assuming the same 0.06 inch thickness material, $Z_s/Z_r = 1.698$, which shows that rectangular cross sections are stronger than round cross sections. This is further borne out because the ratio of the wall cross section areas for the above round and square cross sections equals 1.27. Therefore, although the square member is 27 percent heavier, it is 69.8 percent stronger than the corresponding round member. It follows that the square tube may be smaller in the above example and be of equal strength to a round tube, which is the reason that rectangular and/or square cross section members are used in the superefficient bicycle frame 10. For example, the section modulus for a 1.257" square tube, assuming the same 0.06 inch thickness material, is equal to the section modulus for a 1.5" diameter round tube, i.e. $Z_s/Z_r = 1$.

Additionally, the section modulus formula makes it clear that by tapering or varying the square or rectangular cross section along the length of the tube, the section modulus will vary. This relationship permits smaller rectangular cross sections at points of lower transversal bending stress in the frame in order to reduce the overall weight. The combination of square or rectangular cross section members and tapering along the length of the tubes results in a superefficient frame.

FIG. 5 shows a sectional view of rectangular single tapered seat tube brace 24, which surrounds seat tube 22 and is comprised of formed seat tube brace channel 40 and closure sheet 42, which are welded together at welds 41. FIG. 6 shows a sectional view of rectangular double tapered down tube 14 and is comprised of formed down tube channel 44 and closure sheet 46, which are welded together at welds 45. Instead of welding, formed down tube channel 44 could be riveted to closure channel 48 with blind rivets 50, as shown in FIG. 7. All the members can be formed by either welding or riveting. FIG. 8 shows a sectional view of rectangular double tapered seat stay 16 and is comprised of formed seat stay channel 52 and closure sheet 54, which are welded together. FIG. 9 shows a sectional view of the junction between rectangular double tapered top tube 12 and rectangular double tapered down tube 14 and is comprised of formed top tube channel 60, formed down tube channel 44 and gusset 64, which are welded together at welds 65. The gusset 64 provides a proper junction between rectangular double tapered top tube 12, rectangular double tapered down tube 14, and head tube 26 that properly distributes the stress loads between them and provides a path for the stress between them along line 65 and through gusset 64 to head tube 26. Also, rectangular double tapered top tube 12 and rectangular double tapered down tube 14 join along line 65 to properly transfer the loads between top tube joint wall 78 and down tube joint wall 88, shown in FIGS. 1, 12 and 13.

FIG. 10 shows a sectional view of rectangular double tapered top tube 12 at the 10—10 line of rectangular double tapered top tube 12 in FIG. 1, which is comprised of formed top tube channel 60 and closure sheet 66, which are welded together at welds 67.

The complex segments that form the tapered members of superefficient bicycle frame 10 can be easily constructed by cutting various two dimensional shapes from sheet stock which are subsequently formed into channels, which are then welded or riveted together as discussed above. This method of manufacture permits the ends of the section members to be shaped by laser or plasma cutting, or other means, in the flat before bending. The ends of the sections thus cut and formed may have almost any desired shape in order to increase the strength and efficiency of the joints.

FIG. 12 shows an unformed top tube channel 70, which after bending along top tube bend lines 72, becomes formed top tube channel 60. Also shown in FIG. 12 is hole for seat tube 74 and head tube cutout 76, which is designed to form a proper joint with head tube 26. The dual taper is readily seen in FIG. 12 and is the direct result of dimension "a" being larger in length than dimension "b" and dimension "c" being larger in length than dimension "d". The exact values of the various dimensions depend on the size frame being constructed.

Figure 13:
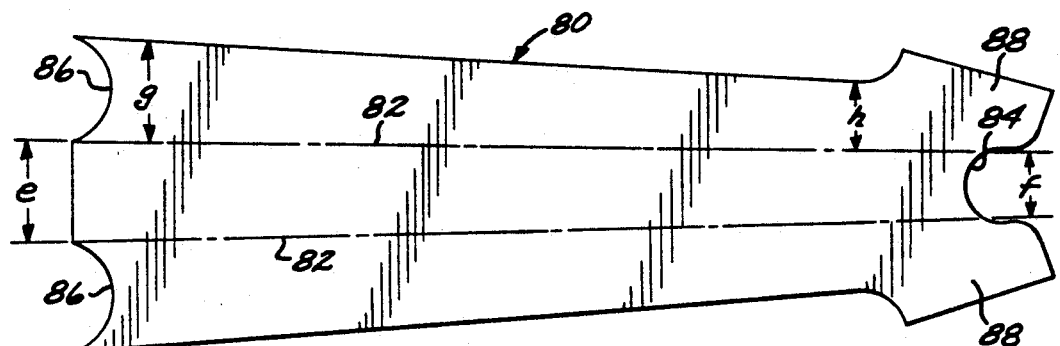
FIG. 13 is a top view of the unformed down tube channel of the present invention.

FIG. 13 shows an unformed down tube channel 80, which after bending along down tube bend lines 82, becomes formed down tube channel 44. Also shown in FIG. 13 is head tube cutout 84, which is designed to form a proper joint with head tube 26 and bottom bracket cutouts 86, which are designed to form a proper joint with bottom bracket 20. The dual taper is readily seen in FIG. 13 and is the direct result of dimension "e" being larger in length than dimension "f" and dimension "g" being larger in length than dimension "h". Again, the exact values of the various dimensions depend on the size frame being constructed.

Figure 14:
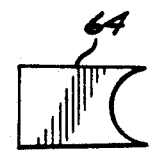
FIG. 14 is a top view of a gusset of the present invention.

FIG. 14 shows a top view of gusset 64, which is used to strengthen the rectangular double tapered top tube 12 and rectangular double tapered down tube 14 joint.

Figure 15:
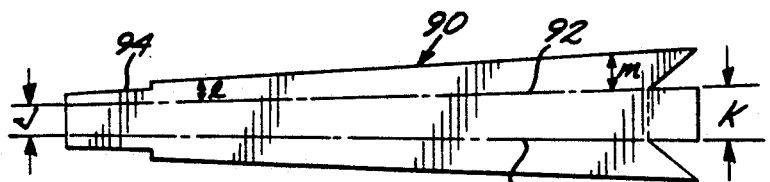
FIG. 15 is a top view of the unformed seat stay channel of the present invention.

FIG. 15 shows an unformed seat stay channel 90, which after bending along seat stay bend lines 92, becomes formed seat stay channel 52. Also shown in FIG. 15 is cutout for dropout bracket 94. The dual taper is readily seen in FIG. 15 and is the direct result of dimension "k" being larger in length than dimension "j" and dimension "m" being larger in length than dimension "l". Again, the exact values of the various dimensions depend on the size frame being constructed.

Figure 16:
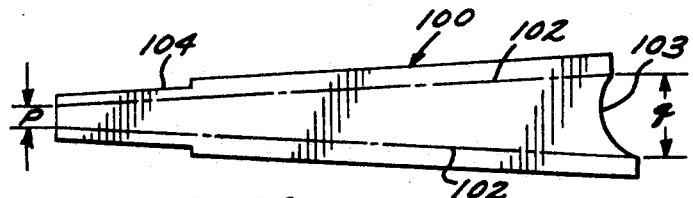
FIG. 16 is a top view of the unformed chain stay channel of the present invention.

FIG. 16 shows an unformed chain stay channel 100, which after bending along chain stay bend lines 102, becomes a formed chain stay channel, which is then welded or riveted to a closure sheet to form rectangular single tapered chain stay 18. Shown in FIG. 16 is cutout for dropout bracket 104. A cutout 103 is provided for properly joining the chain stay with bottom bracket 20. The rectangular single tapered chain stay 18 has a single taper, which is readily seen in FIG. 16 and is the direct result of dimension "q" being larger in length than dimension "p". As shown in FIG. 16, the chain stay bend lines 102 are parallel to the long edge of unformed chain stay channel 100, so this results in no taper in one dimension of rectangular single tapered chain stay 18.

Figure 17:
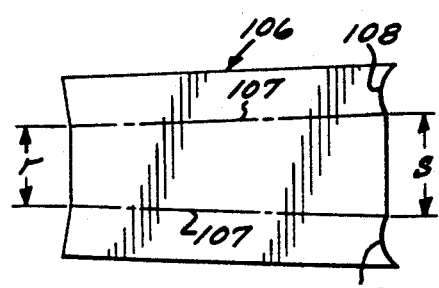
FIG. 17 is a top view of the unformed seat tube frame channel of the present invention.
Figure 18:
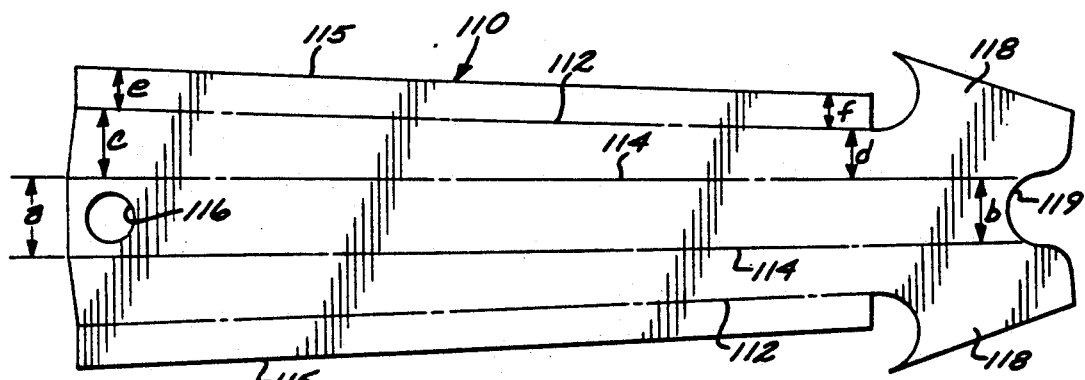

FIG. 17 shows an unformed seat tube frame channel 106, which after bending along seat tube channel bend lines 107, becomes a formed seat tube brace channel, which is then welded or riveted to a closure sheet to form rectangular single tapered seat tube brace 24. The rectangular single tapered seat tube brace 24 has a single taper, which is readily seen in FIG. 17 and is the direct result of dimension "s" being larger in length than dimension "r". As shown in FIG. 17, the seat tube channel bend lines 107 are parallel to the long edge of unformed seat tube frame channel 106, so this results in no taper in one dimension of rectangular single tapered seat tube brace 24. Cutouts 108 are provided for properly joining the seat tube with bottom bracket 20.

Figure 18:
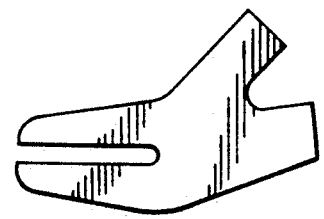
FIG. 18 is a top view of an alternate preferred embodiment of the unformed top tube of the present invention.

FIG. 18 shows an unformed top tube 110 of an alternate preferred embodiment of the frame. The unformed top tube 110 is bent along top tube bend lines 112 and top tube bend lines 114 and then welded along edges 115 to form the top tube. Also shown in FIG. 18 is seat tube hole 116 and head tube cutout 119, which provides for a proper junction between the top tube and the head tube. The dual taper is readily seen in FIG. 18 and is the direct result of dimension "a" being larger in length than dimension "b", dimension "c" being larger in length than dimension "d", and dimension "e" being larger in length than dimension "f". The exact values of the various dimensions depend on the size frame being constructed. The thickness of unformed top tube 110 is constant.

Figure 19:
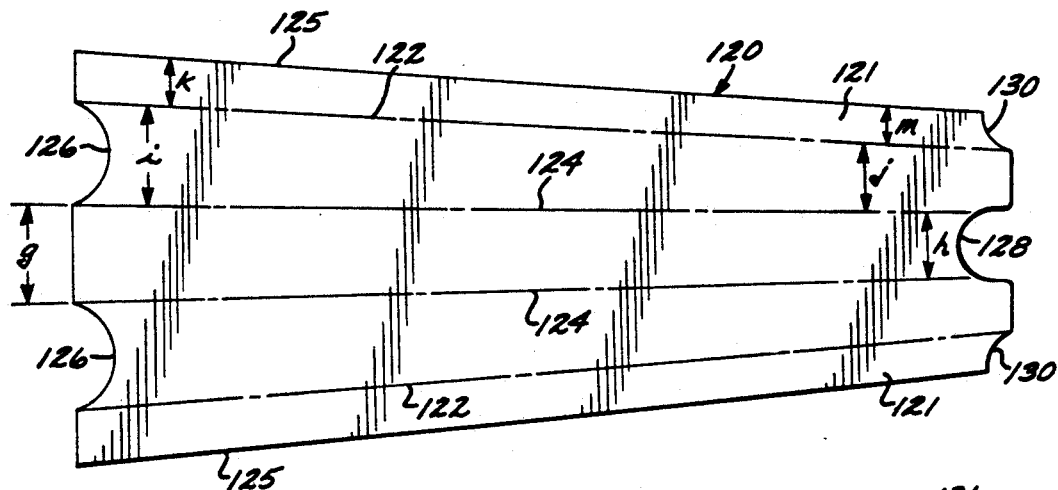
FIG. 19 is a top view of an alternate preferred embodiment of the unformed down tube of the present invention.

FIG. 19 shows an unformed down tube 120 of an alternate preferred embodiment of the frame. The unformed down tube 120 is bent along down tube bend lines 122 and down tube bend lines 124 and then welded along edges 125 to form the down tube. Shown in FIG. 19 are head tube cutout 128 and head tube cutout 130, which provide for proper mating with head tube 26, so that loads are properly transferred. The unformed down tube 120 also has bottom bracket cutout 126, which provides proper mating and load transfer to bottom bracket 20. The dual taper is readily seen in FIG. 19 and is the direct result of dimension "g" being larger in length than dimension "h", dimension "i" being larger in length than dimension "j", and dimension "k" being larger in length than dimension "m". The exact values of the various dimensions depend on the size frame being constructed. The thickness of the unformed down tube 120 is constant.

Figure 20:
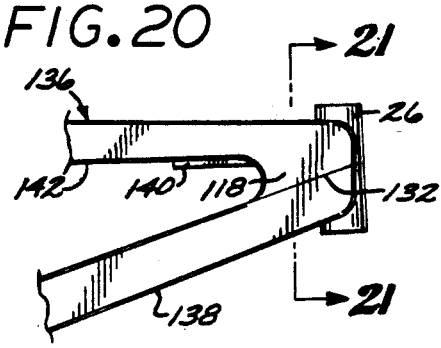
FIG. 20 is a side elevation view of a portion of the frame an alternate preferred embodiment of the present invention showing the junction of the top tube and the down tube with the head tube.
Figure 21:
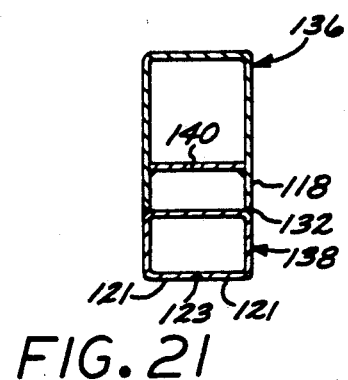
FIG. 21 is a sectional view of the junction of the top tube and the down tube of an alternate preferred embodiment of the present invention, taken along line 21—21 of FIG. 20.
Figure 22:
FIG. 22 is a top view of a gusset of an alternate embodiment of the present invention.

FIG. 20 is a side elevation view of a portion of the frame an alternate preferred embodiment of the present invention showing the junction of top tube 136 and down tube 138 with the head tube 26. Here it is shown how top tube joint wall 118 joins with down tube 138 along weld joint 132. The entire design provides for loads to be properly transferred to the head tube 26 and between the top tube 136 and down tube 138. FIG. 21 is a sectional view of the junction of the top tube and the down tube of an alternate preferred embodiment of the present invention, taken along line 21—21 of FIG. 20. Gusset 140, shown in FIGS. 20, 21 and 22, ensures that the load from lower side 142 of top tube 136 is transferred to head tube 26. FIG. 21 also illustrates how after bending along down tube bend lines 122 and down tube bend lines 124, the down tube 138 is formed by welding edges 125 along weld joint 123.

It is thought that the apparatus and method of construction for the superefficient bicycle frame of the present invention and many of its attendant advantages will be understood from the foregoing description and it will be apparent that various changes may be made in the form, construction and arrangement of the parts thereof and in the methods used without departing from the spirit and scope of the invention or sacrificing all of its material advantages, the forms hereinbefore described being merely a preferred or exemplary embodiments thereof. It is expressly contemplated, for example, that when practical means are found for manufacturing seamless tapered rectangular tubes, some or all of the members of the frame may be seamless.

I claim:

1. A superefficient cycle frame that comprises:
   a head tube;
   a seat tube brace having a bottom and top end;
   a circular bottom bracket coupled to said bottom end of said set tube brace;
   a rectangular double tapered top tube having two vertical walls and two horizontal walls coupled at one end to said head tube and at the other end to said top end of said seat tube brace and wherein said two vertical walls increase in vertical dimension from said head tube to said seat tube brace and wherein said two horizontal walls increase in horizontal dimension from said head tube to said seat tube brace; and
   a rectangular double tapered down tube having two vertical walls and two horizontal walls coupled at one end to said head tube and at the other end to said circular bottom bracket and wherein said two vertical walls increase in vertical dimension from said head tube to said circular bottom bracket and wherein said two horizontal walls increase in horizontal dimension from said head tube to said circular bottom bracket.

2. The superefficient cycle frame of claim 1:
   wherein each of said two vertical walls and said two horizontal walls of said rectangular double tapered top tube is extended in a flat plane and attached to said head tube along the line that said flat plane intersects said head tube so that stresses in said rectangular double tapered top tube are carried directly into said head tube.

3. The superefficient cycle frame of claim 2:
   wherein each of said two vertical walls and said two horizontal walls of said rectangular double tapered down tube is extended in a flat plane and attached to said head tube along the line that said flat plane intersects said head tube so that stresses in said rectangular double tapered down tube are carried directly into said head tube; and
   wherein each of said two vertical walls and said two horizontal walls of said rectangular double tapered down tube is extended in a flat plane and attached to said circular bottom bracket along the line that said flat plane intersects said circular bottom bracket so that stresses in said rectangular double tapered down tube are carried directly into said circular bottom bracket.

4. The superefficient cycle frame of claim 3 that further comprises:
   a seat stay coupled at one end to said top end of said seat tube brace;

a rectangular single tapered chain stay having two horizontal walls and two vertical walls coupled at one end to said circular bottom bracket and at the other end to said seat stay and wherein said two vertical walls increase in vertical dimension from said seat stay to said circular bottom bracket; and wherein each of said two horizontal walls and said two vertical walls of said rectangular single tapered chain stay is attached to said circular bottom bracket along the line that said tow horizontal walls and said two vertical walls intersect said circular bottom bracket so that stresses in said rectangular single tapered chain stay are carried directly into said circular bottom bracket.

5. The superefficient cycle frame that comprises:
a head tube;
a seat tube brace having a bottom and top end;
a circular bottom bracket coupled to said bottom end of said seat tube brace;
a rectangular top tube coupled at one end to said head tube and at the other end to said top end of said seat tube brace; and
a rectangular double tapered down tube having two vertical walls and two horizontal walls coupled at one end to said head tube and at the other end to said circular bottom bracket and wherein said two vertical walls increase in vertical dimension from said head tube to said circular bottom bracket and wherein said two horizontal walls increase in horizontal dimension from said head tube to said circular bottom bracket.

6. The superefficient cycle frame of claim 5:

wherein each of said two vertical walls and said two horizontal walls of said rectangular double tapered down tube is extended in a flat plane and attached to said head tube along the line that said flat plane intersects said head tube so that stresses in said rectangular double tapered down tube are carried directly into said head tube; and wherein each of said two vertical walls and said two horizontal walls of said rectangular double tapered down tube is extended in a flat plane and attached to said circular bottom bracket along the line that said flat plane intersects said circular bottom bracket so that stresses in said rectangular double tapered down tube are carried directly into said circular bottom bracket.

7. The superefficient cycle frame of claim 6 that further comprises:
a seat stay coupled at one end to said top end of said seat tube brace;
a rectangular single tapered chain stay having two horizontal walls and two vertical walls coupled at one end to said circular bottom bracket and at the other end to said set stay and wherein said two vertical walls increase in vertical dimension from said seat stay to said circular bottom bracket; and
wherein each of said two horizontal walls and said two vertical walls of said rectangular single tapered chain stay is attached to said circular bottom bracket along the line that said two horizontal walls and said two vertical walls intersect said circular bottom bracket so that stresses in said rectangular single tapered chain stay are carried directly into said circular bottom bracket.

* * * * *